United States Patent
Champel

(10) Patent No.: US 12,108,124 B2
(45) Date of Patent: Oct. 1, 2024

(54) METHOD AND APPARATUS WITH IMPROVED OVERLAY DESIGN USED IN A VIRTUAL REALITY ENVIRONMENT

(71) Applicant: BEIJING XIAOMI MOBILE SOFTWARE CO., LTD., Beijing (CN)

(72) Inventor: Mary-Luc Georges Henry Champel, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 132 days.

(21) Appl. No.: 17/623,486

(22) PCT Filed: Jul. 3, 2019

(86) PCT No.: PCT/CN2019/094472
§ 371 (c)(1),
(2) Date: Dec. 28, 2021

(87) PCT Pub. No.: WO2021/000276
PCT Pub. Date: Jan. 7, 2021

(65) Prior Publication Data
US 2022/0360865 A1    Nov. 10, 2022

(51) Int. Cl.
*H04N 21/81*    (2011.01)
*G06T 19/00*    (2011.01)
(Continued)

(52) U.S. Cl.
CPC ......... *H04N 21/816* (2013.01); *G06T 19/003* (2013.01); *G09G 5/377* (2013.01);
(Continued)

(58) Field of Classification Search
CPC ............... H04N 5/272; H04N 21/4312; H04N 21/4316; H04N 21/816; H04N 21/85406; H04N 21/8545; H04N 19/597; H04N 19/70; H04N 21/44218; H04N 21/4728; H04N 21/8541; H04N 21/234327; H04N 21/234345; H04N 21/23439; H04N 21/8456; H04N 21/8543; G06T 19/003; G06T 19/006; G09G 2340/125; G09G 2354/00; G09G 2370/20; G09G 51/04; G09G 5/377; G09G 5/14
See application file for complete search history.

(56) References Cited

U.S. PATENT DOCUMENTS

| | | |
|---|---|---|
| 2018/0255417 A1 | 9/2018 | Bosnjak et al. |
| 2018/0332265 A1 | 11/2018 | Hwang et al. |

(Continued)

OTHER PUBLICATIONS

PCT/CN2019/094472 International Search Report and Written Opinion dated Mar. 2, 2020, 7 pages.

(Continued)

*Primary Examiner* — Jin Cheng Wang
(74) *Attorney, Agent, or Firm* — Cozen O'Connor

(57) ABSTRACT

A method, a system and an apparatus are employed in a virtual reality (VR) environment. The method of building a virtual reality (VR) environment includes building the VR environment as formatted video content; defining at least one interactive overlay; and providing the at least one interactive overlay with a position information on a viewpoint of the VR environment.

12 Claims, 2 Drawing Sheets

(51) Int. Cl.
  *G09G 5/377* (2006.01)
  *H04N 5/272* (2006.01)
  *H04N 21/43* (2011.01)
  *H04N 21/431* (2011.01)
  *H04N 21/4722* (2011.01)
  *H04N 21/854* (2011.01)
  *H04N 21/8545* (2011.01)

(52) U.S. Cl.
  CPC ....... *H04N 5/272* (2013.01); *H04N 21/43074* (2020.08); *H04N 21/4316* (2013.01); *H04N 21/4722* (2013.01); *H04N 21/85406* (2013.01); *H04N 21/8545* (2013.01)

(56) References Cited

U.S. PATENT DOCUMENTS

2019/0014361 A1   1/2019   Wang

2020/0221063 A1*  7/2020   Kammachi Sreedhar ................... H04N 21/85406
2020/0250891 A1*  8/2020   Curcio ............. H04N 21/85406
2021/0183010 A1*  6/2021   Mate .................... H04N 19/597
2021/0201855 A1*  7/2021   Kammachi-Sreedhar ................... G09G 5/14
2021/0211780 A1*  7/2021   Deshpande ........ H04N 21/8106
2021/0218908 A1*  7/2021   Fan ........................ H04N 5/272
2021/0219013 A1*  7/2021   Deshpande .......... H04N 21/435
2022/0014786 A1*  1/2022   Huang ................. H04N 19/167
2022/0150296 A1*  5/2022   Hannuksela ......... H04N 21/816
2022/0150461 A1*  5/2022   Kiyama ............. H04N 21/4725
2022/0360865 A1* 11/2022   Champel .......... H04N 21/44218

OTHER PUBLICATIONS

European Patent Application No. 19918522.4, extended Search and Opinion dated Oct. 29, 2021, 7 pages.

\* cited by examiner

METHOD AND APPARATUS WITH IMPROVED OVERLAY DESIGN USED IN A VIRTUAL REALITY ENVIRONMENT

CROSS-REFERENCE TO RELATED APPLICATION

This application is the US national phase application of International Application No. PCT/CN2019/094472, filed on Jul. 3, 2019, the entire contents of which are incorporated herein by reference.

TECHNICAL FIELD

The present invention relates to a method, a system and an apparatus employed in a Virtual Reality (VR) environment, and more particularly to the method, the system and the apparatus with improved overlays.

BACKGROUND

When omnidirectional media content is consumed with a head-mounted display and headphones, only parts of the media that correspond to a user's viewing orientation are rendered, as if the user were in the spot where and when the media was captured. One of the most popular forms of omnidirectional media applications is omnidirectional video, also known as 360° video. Omnidirectional video is typically captured by multiple cameras that cover up to 360° of the scene. Compared to traditional media application formats, the end-to-end technology for omnidirectional video (from capture to playback) is more easily fragmented due to various capturing and video projection technologies. From the capture side, there exist many different types of cameras capable of capturing 360° video, while on the playback side, there are many different devices that are able to playback 360° video with different processing capabilities. To avoid fragmentation of omnidirectional media content and devices, a standardized format for omnidirectional media applications is specified in the Omnidirectional Media Format (OMAF) standard.

OMAF defines a media format that enables omnidirectional media applications, focusing on 360° video, images, and audio, as well as associated timed text. What is specified in OMAF comprises: (1) a coordinate system that consists of a unit sphere and three coordinate axes, namely the X (back-to-front) axis, the Y (lateral, side-to-side) axis, and the Z (vertical, up) axis; (2) projection and rectangular region-wise packing methods that may be used for conversion of a spherical video sequence or image into a two-dimensional rectangular video sequence or image, respectively; (3) storage of omnidirectional media and the associated metadata using the ISO Base Media File Format (ISOBMFF); (4) encapsulating, signaling, and streaming of omnidirectional media in a media streaming system, e.g., dynamic adaptive streaming over HTTP (DASH) or MPEG media transport (MMT); and (5) media profiles and presentation profiles that provide interoperable and conformance points for media codecs as well as media coding and encapsulation configurations that may be used for compression, streaming, and playback of the omnidirectional media content.

With the development of VR devices, it is desirable to allow a user to interact with the whole OMAF application. An improved method, system and apparatus used in VR environment, that overcome the above-mentioned problems are desired.

BRIEF SUMMARY OF THE INVENTION

The present disclosure satisfies the foregoing needs by providing, inter alia, method, system and apparatus with improved overlay design used in a VR environment.

In a first aspect, a method of building a virtual reality (VR) environment, comprising: building the VR environment as formatted video content; defining at least one interactive overlay; and providing the at least one interactive overlay with a position information on a viewpoint of the VR environment. wherein, the formatted video content and each interactive overlay are in accordance with omnidirectional media format (OMAF).

In a second aspect, an apparatus is disclosed which is configured to build a VR environment by performing the above-described method.

In a third aspect, a non-transitory computer readable storage medium is provided.

Other objects, advantages and novel features of the invention will become more apparent from the following detailed description of the present embodiment when taken in conjunction with the accompanying drawing.

DETAILED DESCRIPTION OF THE PREFERRED EMBODIMENT

Figure 1:
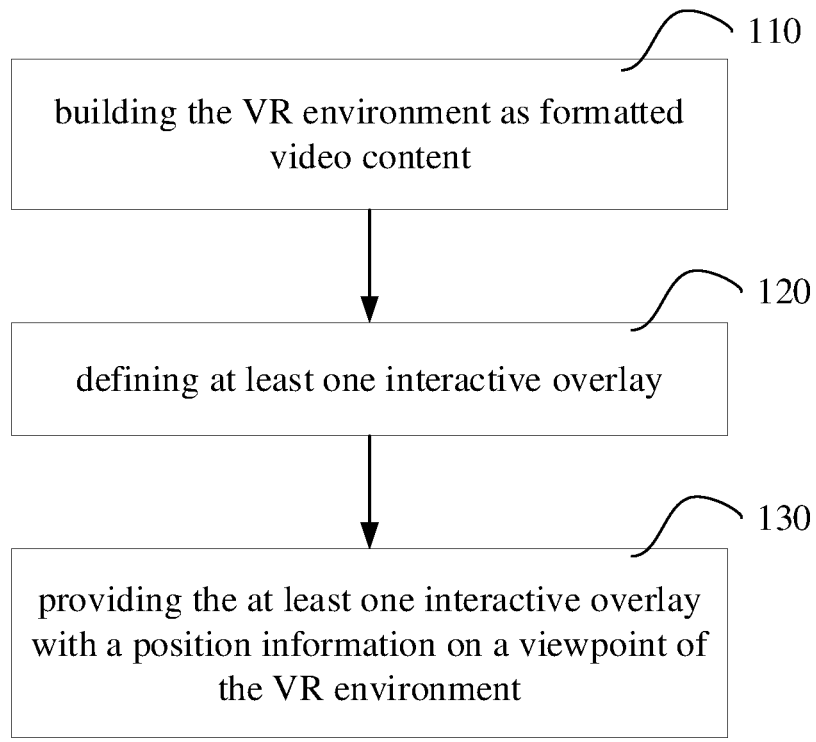
FIG. 1 illustrates a flow chart of a method of building a VR environment according to an example of the present disclosure.

Reference will be made to the drawing figure to describe the present invention in detail, wherein depicted elements are not necessarily shown to scale and wherein like of similar elements are designated by same or similar reference numeral through the several views and same or similar terminology.

In this disclosure, OMAF stands for Omnidirectional MediA Format which is also known as MPEG-I-part 2 standard. Viewpoint, in OMAF, is considered the center of the sphere from which the VR360 video is rendered. This can be understood as the user position. Viewport, in OMAF, is a portion of the VR360 video (for instance, a visible viewport is the portion of the VR360 video seen by a user at a point in time). For visible viewport, this can be understood as the user viewing orientation. Overlay, in OMAF, is a piece of visual media rendered over a viewpoint or over a viewport.

As used herein, the ISOBMFF (ISO Base Media File Format) grammar/structure aims to clearly illustrate the instant solution, which constitutes none of any limitations to the present invention.

As used herein, the term "packed_picture_width" and the term "packed_picture_height", the term "viewpoint_id", and the like, are employed in the disclosure to indicate a corresponding parameter thereof, which are applied as usual. These terms constitute no limitations to the present invention.

The present technical disclosure concerns the possibility to assign interactive capability in an OMAF application. More particularly, the present technical disclosure aims to enable OMAF with the following characteristics for overlays: (1) capability to locate an overlay in a region of a viewpoint by defining sphere relative overlays; (2) capability to associate overlay media with background media via a pre-defined opacity; and (3) capability to define interactions on the overlay itself such as resize, move, switch on/off, rotate, modify overlay source media. Hereinafter, an overlay assigned with interactive capability is also referred to as an interactive overlay or an interactive sensor for brief. Nevertheless, assigning interactive capability to the overlay can allow the user to interact with the whole OMAF application but not just the overlay, and the overlay can be easily defined and presented without missing any associated media to be displayed over the background.

Hereinafter, a technical solution of the present invention is described in detail. With reference to FIG. 1, according to an example of the present disclosure, a method of building a VR environment may include the following:

At block 110, the VR environment is built as formatted video content. For example, the VR environment may be built as formatted video content which is to be presented by a VR equipment when a user puts the VR equipment on his/her head and turns it on. The formatted video content may be in accordance with OMAF. That is, OMAF can describe format of the video content, such as, how to build and signal a VR application, rendering rules and the like.

At block 120, at least one interactive overlay is defined. Each interactive overlay may be in accordance with OMAF. Where, as described in above, the interactive overlay is an overlay assigned with interactive capability such that a user can interact with the interactive overlay when the VR environment is presented to him/her.

At block 130, the at least one interactive overlay is provided with a position information on a viewpoint of the VR environment. In this way, when the VR environment is presented by a VR equipment to a user, the at least one interactive overlay may be provided on a viewpoint of the VR environment according to the position information and the user can interact with the interactive overlay, such as switching viewpoint in the VR environment.

Each interactive overlay is defined according to omnidirectional media format (OMAF). As described in above, the present technical disclosure introduces the following characteristics when defining interactive sensors/overlays:

definition of a viewpoint switching action that can be launched when interacting with a viewpoint, that is, interaction with the viewpoint presented with an overlay may initiate a viewpoint switching action;

optional definition of a default interaction with an overlay; and/or definition of an overlay without media content to be presented.

Figure 2:
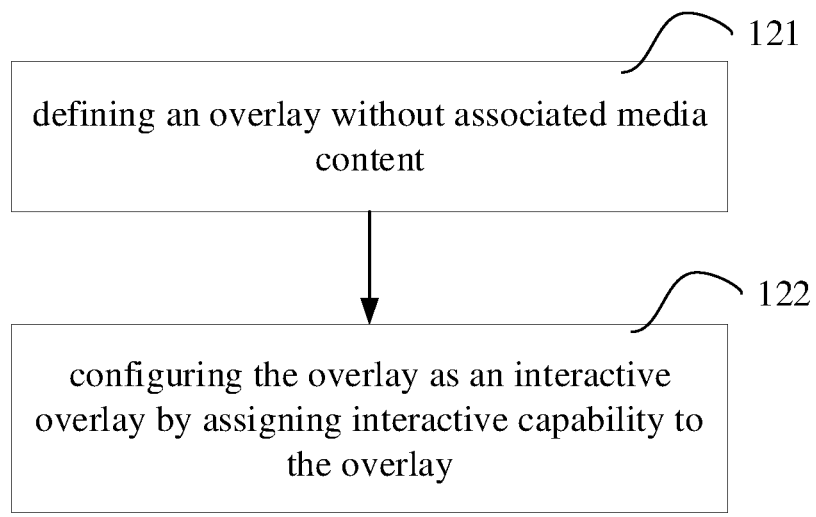
FIG. 2 illustrates a flow chart of a method of defining an interactive overlay according to an example of the present disclosure.
Figure 3:
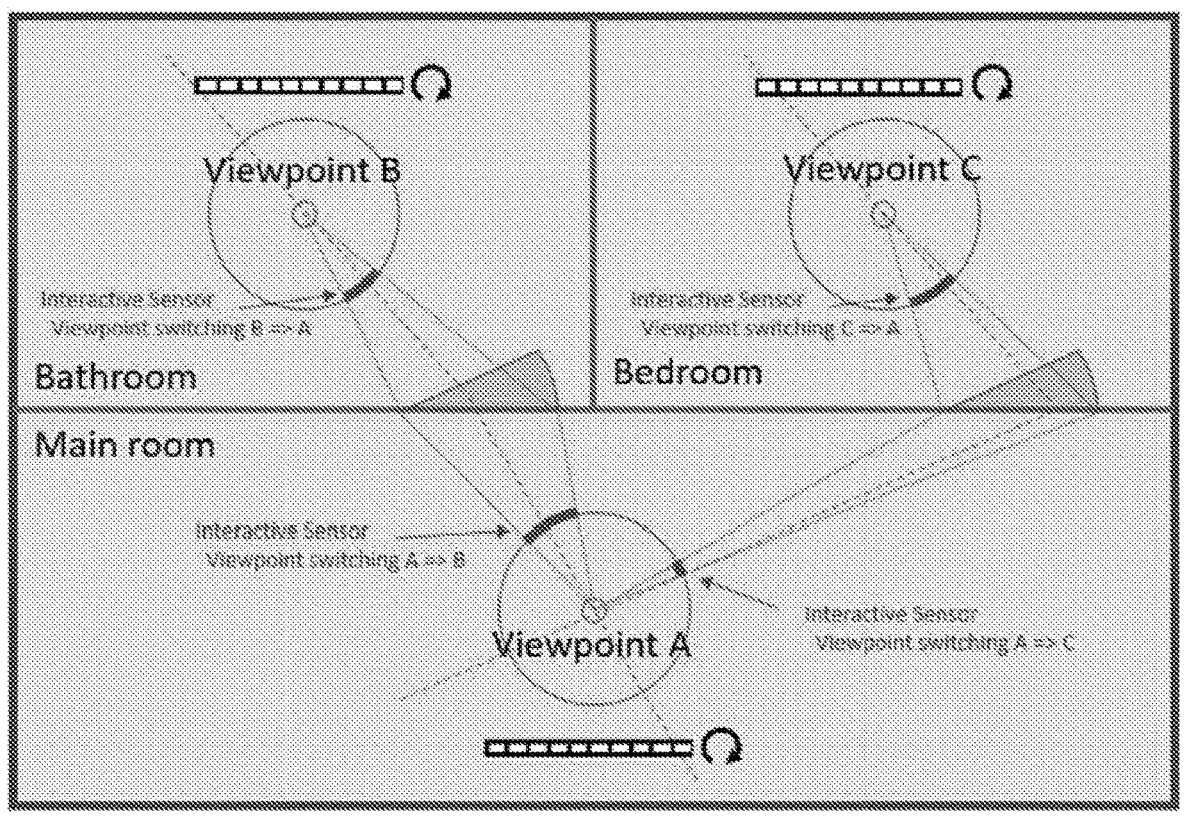
FIG. 3 is schematic diagram illustrating a use of the present invention.

In considering the above, as shown in FIG. 2, according to an example of the disclosure, a method of defining an interactive overlay may include the following:

At block 121, an overlay without any associated media content is defined. That is, the overlay is associated with no media content.

At block 122, the defined overlay without associated media content is assigned with interactive capability, so to be configured as an interactive overlay. In other words, the interactive overlay is obtained from the overlay without associated any media content by being assigned with interactive capability, such as capable of initiating a viewpoint switching and/or triggering at least one pre-defined controls for user interaction.

Hereinafter, detailed embodiments of the present invention is described in accordance with OMAF.

The current OMAF defines media overlays with the following ISOBMFF structures:

OverlayStruct( ) which defines all overlays present in a given OMAF application;

SingleOverlayStruct( ) which specifies each overlay metadata; and

Overlay_Control_Struct which, by using specified Bit index information, defines multiple parameters of the overlay (see table below from section 7.13.2 Overlay control structures in OMAF).

| Bit index | Description |
| --- | --- |
| 0 | Parameters for viewport-relative overlay |
| 1 | Parameters for sphere-relative projected omnidirectional overlay |
| 2 | Parameters for sphere-relative 2D overlay |
| 3 | Source region for the overlay. Indicates the region within the decoded picture that is used as the content of the overlay. |
| 4 | Recommended viewport overlay. Indicates the recommended viewport track whose recommended viewports are used as the content of the overlay. |
| 5 | Overlay layering order |
| 6 | Overlay opacity |
| 7 | Controls for user interaction |
| 8 | Overlay label |
| 9 | Overlay priority |
| 10 | Associated sphere region |
| 11 | Overlay alpha composition |

In order to define a media source of an overlay, Bit index 3 or 4 is used. OMAF specification mandates that only a maximum of 1 can be used at a time and that if none is used, the media source of the overlay is the entire associated decoded picture. This behavior prevents defining overlays without associated media content. In considering the above provision of OMAF, for defining an interactive overlay without any associated media content, some parameter concerning the overlay and/or the source region for the overlay may be set to some value, such as zero which has not been used in related prior art; or, the overlay may be provided with a new customized attribute, for example, by creating a new Bit index or defining a new Bit index behavior.

With reference to the above table, according to some examples of the present disclosure, the following optional solutions may be used to define an overlay without associated media content:

(1) Creating a new Bit index to define that an overlay has no associated media source.

(2) Using Bit index 6 and mandating that opacity is set to 0, hence defining a fully transparent overlay media.

(3) Using Bit index 3 and defining an empty region by mandating that the region parameters packed_picture_width and packed_picture_height are both set to 0.

(4) Defining a new Bit index behavior by mandating that when neither Bit index 3 or Bit index 4 is used, which means that there is no overlay media associated with the overlay.

When an overlay without associated any media content is defined, in order to enable user to interact with the VR environment via the overlay, it may be necessary to assign the overlay with interactive capability, such as, capable of initiating a viewpoint switching and/or triggering some control for user interactions.

With reference to the above table again, Bit index 7 may also be used to associate an interactive overlay with controls for user interaction, as Bit index 7 is defined to indicates controls for user interaction. Controls for user interactions may include at least one of the followings:

Changing the position of the overlay;
Changing the depth of the overlay;
Switching the overlay on;
Switching the overlay off;
Changing the opacity of the overlay;
Resizing the overlay;
Rotating the overlay; and
Switching the media source of the overlay.

In order to support other type of interactions that are not limited to the overlay itself, the present disclosure proposes to add the following interaction: viewpoint switching which includes as a parameter the e of the destination viewpoint to switch to.

One may also note that several actions on an overlay may be defined but in some players, the interactions means with the content may be limited to just one kind of interaction (simple click, gaze hot points) while other players may support more advanced interaction means (click, double click, right hand or left hand click, and so forth). In order to solve this issue, the present disclosure proposes at least one of the following:

defining a primary/default action on the overlay and associating it to one of the allowed actions on the overlay;

optionally defining a secondary action on the overlay and associating it to one of the allowed actions on the overlay, that is, if there are two or more allowed actions on one interactive overlay, different allowed actions on the interactive overlay has different priority of being performed in response to interaction from the user; and mandating that only one of the allowed actionseinitiated in response to one interaction from a user.

The following ISOBMFF grammar is a possible embodiment of the present invention for Controls for user interaction (Bit index set to 7):

```
aligned(8) class OverlayInteraction( ) {
    unsigned int(1) change_position_flag;
    unsigned int(1) change_depth_flag;
    unsigned int(1) switch_on_off_flag;
    unsigned int(1) change_opacity_flag;
    unsigned int(1) resize_flag;
    unsigned int(1) rotation_flag;
    unsigned int(1) source_switching_flag;
      unsigned int(1) viewpoint_switching_flag;
      unsigned int(1) default_action_flag;
      unsigned int(1) secondary_action_flag;
      if (viewpoint_switching_flag)
      {
        unsigned int(16) destination_viewpoint_id;
      }
      if (default_action_flag) { unsigned int(8) action_id; }
      if (secondary_action_flag) { unsigned int(8) action_id; }
      bit(6) reserved = 0;
    }
```

The following semantics are associated to the new elements in its possible ISOBMFF grammar embodiment defined herebefore:

1) that viewpoint_switching_flag equal to 1 specifies that a viewpoint switching to the viewpoint identified by destination_viewpoint_id shall be initiated when interacting with the media overlay.

2) that default_action_flag equal to 1 specifies that a default action is set for the overlay.
3) that secondary_action_flag equal to 1 specifies that a secondary action is set for the overlay.
4) that action_id specifies the action to be used as defined in the following table:

| action_id | Action |
|---|---|
| 0 | Change position of overlay. Note: change_position_flag shall be set to 1. |
| 1 | Change depth of overlay. Note: change_depth_flag shall be set to 1. |
| 2 | Switch overlay on/off. Note: switch_on_off_flag shall be set to 1. |
| 3 | Change opacity of overlay. Note: change_opacity_flag shall be set to 1. |
| 4 | Resize overlay. Note: resize_flag shall be set to 1. |
| 5 | Rotate overlay. Note: rotation_flag shall be set to 1. |
| 6 | Change the source of the overlay. Note: source_switching_flag shall be set to 1. |
| 7 | Initiate a viewpoint switching. Note: viewpoint_switching_flag shall be set to 1. |

Example of Use

Referring to FIG. 1, an OMAF application is used to build a virtual visit of an apartment. The apartment contains a main room, a bathroom and a bedroom. Both the bathroom and the bedroom are accessible from the main room through a door. Each room is presented in the OMAF application thanks to an OMAF viewpoint in the middle of the room. Viewpoint A shows the main room. Viewpoint B shows the bathroom. And, Viewpoint C shows the bedroom. The OMAF application timeline is the following:

Application starts in Viewpoint A.

All viewpoints (A, B and C) continue to loop until the application is ended or a viewpoint switching is triggered.

Viewpoint switching from one room to another is described thanks to the present invention by defining an interactive sensor (such as a media overlay without media content, or a transparent media overlay) whose location is mapped on the 360 sphere at the precise location of doors and whose destination_viewpoint_id points to the viewpoint directly behind that door. All in all, the following sensors are created:

A first sensor is defined in Viewpoint A, located on the door to the bathroom, with a viewpoint_switching_flag set to 1 and its destination_viewpoint_id set to Viewpoint B id.

A second sensor is defined in Viewpoint A, located on the door to the bedroom, with a viewpoint_switching_flag set to 1 and its destination_viewpoint_id set to Viewpoint C id.

A third sensor is defined in Viewpoint B, located on the door to the main room, with a viewpoint_switching_flag set to 1 and its destination_viewpoint_id set to Viewpoint A id.

A fourth sensor is defined in Viewpoint C, located on the door to the main room, with a viewpoint_switching_flag set to 1 and its destination_viewpoint_id set to Viewpoint A id.

Apparently, the embodiment allows the user to have a different experience, for example, when he comes back to room A by giving him a destination viewport directly opposite to the door of that room B or C in room A as if he were walking through that door.

In a word, with the destination viewport information, it becomes possible for content creators to define a specific viewport to be used at the destination viewpoint after the switching rather than relying on the default or recommended viewport. In particularly, this allows to define different destination viewports on the same destination viewpoint for different source viewpoints.

In conclusion, the OMAF media overlays as disclosed in the present invention, are modified in a way that that it becomes possible to define media overlays without media content and turn them into interactivity sensors. The OMAF media overlays interactions are modified so as to add the capability to initiate viewpoint switching as an action resulting from the user's interaction with the media overlay. The OMAF media overlays interactions are modified so as to add the capability to define a default action and possibly a secondary action to be used when user interacts with the media overlay.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of building a virtual reality (VR) environment, comprising:
    building the VR environment as formatted video content;
    defining at least one interactive overlay; and
    providing the at least one interactive overlay with a position information on a viewpoint of the VR environment;
    wherein, the formatted video content and each interactive overlay are in accordance with omnidirectional media format (OMAF);
    wherein said defining the at least one interactive overlay comprises:
    defining an overlay without associated media content; and
    configuring the overlay as an interactive overlay by assigning interactive capability to the overlay;
    wherein said defining the overlay without associated media content comprises:
    defining an overlay with a specified attribute, wherein said specified attribute is defined by a custom-defined Bit index information indicating that the overlay has no associated media source.

2. The method as claimed in claim 1, wherein the overlay with said specified attribute indicates that neither Bit index information concerning source region for the overlay nor Bit index information concerning recommended viewport overlay is used.

3. The method as claimed in claim 1, wherein said assigning interactive capability to the overlay comprises at least one of:
    defining one or more allowed actions on the overlay, wherein
    the allowed actions comprise at least a default action on the overlay and
    different allowed actions on the overlay has different priority of being performed; and
    specifying that only one of the allowed actions on the overlay is initiated in response to one interaction from a user.

4. The method as claimed in claim 3, wherein, said allowed actions on the overlay comprise at least one of:
    an action of switching the viewpoint to another viewpoint; and
    an action of changing at least one parameter of the overlay.

5. The method as claimed in claim 1, wherein said defining the overlay without associated media content further comprises:
    defining an overlay of which at least one parameter is set to zero, wherein said at least one parameter of the overlay comprise at least one of: opacity of the overlay, width of source region for the overlay, and height of source region for the overlay.

6. An apparatus, configured to build a VR environment by:
    building the VR environment as formatted video content;
    defining at least one interactive overlay; and
    providing the at least one interactive overlay with a position information on a viewpoint of the VR environment;
    wherein, the formatted video content and each interactive overlay are in accordance with omnidirectional media format (OMAF);
    wherein said defining the at least one interactive overlay comprises:
    defining an overlay without associated media content; and
    configuring the overlay as an interactive overlay by assigning interactive capability to the overlay;
    wherein said defining the overlay without associated media content comprises:
    defining an overlay with a specified attribute, wherein said specified attribute is defined by a custom-defined Bit index information indicating that the overlay has no associated media source.

7. The apparatus as claimed in claim 6, wherein the overlay with said specified attribute indicates that neither Bit index information concerning source region for the overlay nor Bit index information concerning recommended viewport overlay is used.

8. The apparatus as claimed in claim 6, wherein said assigning interactive capability to the overlay comprises at least one of:
    defining one or more allowed actions on the overlay, wherein
    the allowed actions comprise at least a default action on the overlay and
    different allowed actions on the overlay has different priority of being performed; and
    specifying that only one of the allowed actions on the overlay is initiated in response to one interaction from a user.

9. The apparatus as claimed in claim 8, wherein, said allowed actions on the overlay comprise at least one of:
    an action of switching the viewpoint to another viewpoint; and
    an action of changing at least one parameter of the overlay.

10. The apparatus as claimed in claim 6, wherein said defining the overlay without associated media content further comprises:
    defining an overlay of which at least one parameter is set to zero, wherein said at least one parameter of the overlay comprise at least one of: opacity of the overlay, width of source region for the overlay, and height of source region for the overlay.

11. A non-transitory computer readable storage medium stored thereon with computer instructions, which when executed by a processor, causes the processor to implement a method of building a virtual reality (VR) environment, the method comprising:
building the VR environment as formatted video content;
defining at least one interactive overlay; and
providing the at least one interactive overlay with a position information on a viewpoint of the VR environment;
wherein, the formatted video content and each interactive overlay are in accordance with omnidirectional media format (OMAF);
wherein said defining the at least one interactive overlay comprises:
defining an overlay without associated media content; and
configuring the overlay as an interactive overlay by assigning interactive capability to the overlay;
wherein said defining the overlay without associated media content comprises:
defining an overlay with a specified attribute, wherein said specified attribute is defined by a custom-defined Bit index information indicating that the overlay has no associated media source.

12. The non-transitory computer readable storage medium as claimed in claim 11, wherein said defining the overlay without associated media content further comprises:
defining an overlay of which at least one parameter is set to zero, wherein said at least one parameter of the overlay comprise at least one of: opacity of the overlay, width of source region for the overlay, and height of source region for the overlay.

* * * * *